United States Patent [19]

Arduengo, III et al.

[11] Patent Number: 5,084,542
[45] Date of Patent: Jan. 28, 1992

[54] EPOXY/ISOCYANATE CROSSLINKED COATINGS CONTAINING 1,3-DISUBSTITUTED IMIDAZOLE-2-THIONE CATALYSTS

[75] Inventors: Anathony J. Arduengo, III, Wilmington, Del.; Patrick H. Corcoran, Cherry Hill, N.J.

[73] Assignee: E. I. du Pont de Nemours and Company, Wilmington, Del.

[21] Appl. No.: 531,327

[22] Filed: May 31, 1990

[51] Int. Cl.$^5$ ............................................. C08G 18/30
[52] U.S. Cl. ............................................................ 528/53
[58] Field of Search ................................................. 528/53

[56] References Cited

U.S. PATENT DOCUMENTS

| | | | |
|---|---|---|---|
| 2,544,746 | 3/1951 | Baum | 260/79.5 |
| 3,240,738 | 3/1966 | Mitamura et al. | 260/29.6 |
| 3,260,565 | 7/1966 | Beachem | 8/116.3 |
| 3,304,312 | 2/1967 | Beachem | 260/309.7 |
| 3,310,539 | 3/1967 | Convert et al. | 260/79.5 |
| 3,509,018 | 4/1970 | Leskin et al. | 161/241 |
| 3,517,722 | 6/1970 | Endter | 152/359 |
| 3,690,939 | 9/1972 | Wegmann | 117/126 |
| 3,708,344 | 1/1973 | Bernstein | 136/137 |
| 3,728,355 | 4/1973 | D'Amico et al. | 260/309.7 |
| 3,748,169 | 7/1973 | Keller | 117/106 |
| 3,798,138 | 3/1974 | Ostrow et al. | 204/52 |
| 3,803,042 | 4/1974 | Knox et al. | 252/180 |
| 3,841,982 | 10/1974 | Yee | 204/55 |
| 3,867,480 | 2/1975 | Fiyyoshi et al. | 260/873 |
| 3,976,625 | 8/1976 | Starmer | 260/79.5 |
| 4,046,701 | 9/1977 | Smith | 252/8.1 |
| 4,067,794 | 1/1978 | Ganzi et al. | 204/301 |
| 4,072,712 | 2/1978 | Meisert et al. | 260/566 |
| 4,080,493 | 3/1978 | Yosui et al. | 526/192 |
| 4,093,415 | 6/1978 | Defago et al. | 8/25 |
| 4,113,947 | 9/1978 | Deiner et al. | 544/196 |
| 4,151,142 | 4/1979 | Herman et al. | 260/296 |
| 4,176,017 | 11/1979 | Martin | 204/55 |
| 4,177,072 | 12/1979 | Ono et al. | 430/302 |
| 4,198,237 | 4/1980 | Nahara et al. | 430/415 |
| 4,198,328 | 4/1980 | Bertelli et al. | 260/22 |
| 4,222,779 | 9/1980 | Bergali et al. | 106/14.12 |
| 4,269,746 | 5/1981 | Tabar et al. | 260/23.7 |
| 4,347,108 | 8/1982 | Willis | 204/52 |
| 4,431,725 | 2/1984 | Tachikawa et al. | 430/325 |
| 4,582,723 | 4/1986 | Markert et al. | 528/53 |
| 4,642,351 | 2/1987 | Woo et al. | 548/317 |

OTHER PUBLICATIONS

Organic Syntheses, vol. 64, 1986, #92–95.

Primary Examiner—Maurice J. Welsh
Assistant Examiner—Rachel Johnson
Attorney, Agent, or Firm—John M. Lynn

[57] ABSTRACT

The present invention describes the use of 1,3-disubstituted imidazole-2-thiones as catalysts for crosslinking epoxy functionalized materials with isocyanate functionalized materials. Epoxy/Isocyanate coatings containing these improved catalysts offer the following advantages: excellent pot-life with rapid cure in air at ambient temperatures, control of hardness and toughness of the cured resins, coatings which have a reduced volatile organic content, a curing process which provides clear colorless coatings, and excellent resistance to acids and bases which will improve durability.

15 Claims, No Drawings

EPOXY/ISOCYANATE CROSSLINKED COATINGS CONTAINING 1,3-DISUBSTITUTED IMIDAZOLE-2-THIONE CATALYSTS

FIELD OF THE INVENTION

We have discovered that 1,3-disubstituted imidazole-2-thiones are useful for catalyzing ambient temperature crosslinking reactions between polymers with pendent isocyanates and polymers with pendent epoxy functionality. Previously condensation reactions between isocyanates and epoxides have been catalyzed with amines, stibonium halides, aluminum halide complexes, and lithium halides. These conventional catalyst require either high temperature to cure, are expensive, or give polymers undesirable properties. The use of 1,3-disubstituted imidazole-2-thiones are especially advantageous since they allow a low temperature cure of epoxy/isocyanate resins that are useful as coatings. Coatings prepared in this have a number of significant advantages.

BACKGROUND

Coating compositions and bulk resins derived from epoxy/isocyanate crosslinking are known in the art as shown by Senger, J. S.; Yilgor, I.; McGrath, J. E.; Patsiga, R. A. (J. Appl. Polym. Sci., 1989, 38(2), 373–82); Fujiwara, Masahiro; Baba, Akio; Matsuda, Haruo (J. Heterocycl. Chem., 1988, 25(5), 1351–7); Marks, Maurice J. (Polym. Mater. Sci. Eng., 1988, 58, 864–8); Uribe, M.; Hodd, K. A. (Polym. Prepr. (Am. Chem. Soc., Div. Polym. Chem.), 1984, 25(2), 43–4); Kordomenos, P. I.; Frisch, K. C.; Kresta, J. E. (J. Coat. Technol., 1983, 55(700), 59–61); U.S. Pat. No. 4,066,628 filed Aug. 2, 1976; Ashida, K. (Eur. J. Cell. Plast., 1980, 35 3(4), 122–5); Hefner, Robert E., Jr. U.S. Pat. No. 4742146, 1988); Mueller, Hanns Peter; Kerimis, Dimitrios; Heine, Heinrich; Uerdingen, Walter (Ger. Offen., DE 3600764, 1987); and Kaneko, Shoroku; Yamaoka, Sigenori; Mizuno, Masuo; Okabe, Yukihiro (Fr. Demande, FR 2499579, 1982). In almost all these cases elevated temperatures are necessary to affect the condensation reaction between isocyanate and epoxy functionalities. An ambient temperature condensation reaction between isocyanates and epoxides has been developed by Trost, Barry M.; Sudhakar, and Anantha R. (J. Am. Chem. Soc., 1988, 110(23), 7933–5) but requires the use of an expensive palladium catalyst and the epoxy group must be a vinyl substituted epoxy. These restrictions severely limit the utility of this method. None of the above citations disclose or suggest the use 1,3-disubstituted imidazole-2-thiones to catalyze the condensation reaction between epoxy and isocyanate functionality.

Unrelated references such as Berstein, P. (U.S. Pat. No. 3,708,344 1973); Martin, S. (U.S. Pat. No. 4,176,017 1979); Yee, G. (U.S. Pat. No. 3,841,982 1974) disclose the use of 1,3-disubstituted imidazole-2-thiones as depolarizers and modifiers for electrochemical deposition. These citations do not disclose or suggest use 1,3-disubstituted imidazole-2-thiones to catalyze the condensation reaction between epoxy and isocyanate functionality. Several preparations have been reported for 1,3-disubstituted imidazole-2-thiones such as Benac, B; Burgess, E. M.; Arduengo, A. J., III (Organic Syntheses, 1986, 64, 92), however these preparations do not teach or suggest the utility of 1,3-disubstituted imidazole-2-thiones as crosslinking agents for epoxy/isocyanate systems. The use of 1,3-disubstituted imidazole-2-thiones as crosslinking agents for epoxy/anhydride reactions is disclosed in commonly assigned, co-pending cases Ser. No. 07/389,897 and Ser. No. 07/389,895 which were both filed on Aug. 4, 1989.

SUMMARY OF THE INVENTION

The present invention describes the use of 1,3-disubstituted imidazole-2-thiones as condensation catalysts for epoxy/isocyanate reactions. Epoxy/isocyanate coatings containing these improved catalysts offer the following advantages: excellent pot-life with rapid cure in air at ambient temperatures, control of hardness and toughness of the cured resins, coatings which have a reduced volatile organic content (VOC), a curing process which provides clear colorless coatings, excellent resistance to acids and bases which will improve durability, and a high gloss appearance.

The 1,3-disubstituted imidazole-2-thiones of the present invention have the following structure:

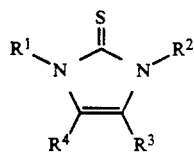

where $R^1$ and $R^2$ are independently hydrocarbyl or substituted hydrocarbyl; and $R^3$ and $R^4$ are independently hydrogen, hydrocarbyl or substituted hydrocarbyl. Any or all of the substituents $R^1$ through $R^4$ may be a polymeric resin so that the catalyst is polymer bound.

The term "substituted hydrocarbyl" is used herein to mean any substituent which does not interfere with the crosslinking reaction. For example, suitable substituents include, but are not limited to, ether, ester, carboxylic acid, halo, amino, hydroxyl, mercapto, vinyl and acetylenic.

DETAILED DESCRIPTION OF THE INVENTION

The present invention describes a polymer crosslinking system that comprises an epoxy functionalized compound, and isocyanate functionalized compound and a 1,3-disubstituted imidazole-2-thione. Resins crosslinked in this fashion have uses in paints, coatings, laminates, foams, moldings, castings and adhesives. When used in paints and coatings the polymers crosslinked in this fashion show improved appearance (especially since long after the coating is applied it maintains a "wet-look"), has excellent DOI (definition of reflected images), posesses an excellent pot-life to cure-rate balance, has excellent chemical resistance to both acids and bases, has low inherent cured resin color, and has excellent toughness and hardness. Additionally, this chemistry can be formulated into very low VOC (volatile organic content) paints.

Typically, the reactive components used for making an epoxy/isocyanate coating are an epoxy bearing polymer, copolymer, or monomer and an isocyanate bearing polymer, copolymer, or monomer. Any or all of the epoxy, isocyanate or 1,3-disubstituted imidazole-2-thione components can be used neat or in a solvent. These three components can be supplied to the user in separate containers and are subsequently mixed on demand. Alternatively, the epoxy and isocyanate components may be premixed and supplied to the user along with a separate catalyst package containing the 1,3-disubstituted imidazole-2-thione component which can be mixed to activate the paint on demand. In some cases it is also possible to place the catalyst in a package together with one or the other of the epoxy or isocyanate components. The epoxy/isocyanate reaction catalyzed by 1,3-disubstituted imidazole-2-thione may not proceed as well in an anhydrous environment (e.g. an environment lacking atmospheric moisture).

The epoxy component of the epoxy/isocyanate coating may be any polymer, copolymer or compound with a weight average molecular weight of less than 100,000 containing at least one and preferably more epoxy groups. For most coating uses two or more epoxy groups are particularly advantageous. Also low molecular weight monomeric epoxides may be used. Our most preferred epoxy components are copolymers prepared from alkyl (meth)acrylates [hereinafter "(meth)acrylates" refers to either acrylates or methacrylates] with glycidyl (meth)acrylates. As will be apparent to one skilled in the art, there are a number of different monomeric epoxides which could be used to form the epoxy polymer or copolymer. Some of these are disclosed in U.S. Pat. Nos. 4,816,500 and 4,066,628 which is incorporated herein by reference. The preferred epoxy copolymers may be used as the sole epoxy component or in combination with polyepoxides such as the polyglycidylethers of sorbitol or Araldite CY-184 ® (from Ciba-Geigy Corporation) or epoxies based on Bisphenol A such as Epon 1001 ® (available fron Shell Chemical Company).

Typical solvents used to prepare the epoxy functional polymer and used as a diluent for the coating composition are as follows: tetrahydrofuran, toluene, xylene, butyl acetate, ethylbenzene, higher boiling aromatic hydrocarbons, amyl acetate, ethyl acetate, 2-butanone, propyl acetate, ethylene or propylene glycol mono alkyl ether acetates and so forth.

The isocyanate functional compounds that may be used are monomeric, oligomeric, or polymeric materials. Preferably the isocyanate functional compound is any polymer or co-polymer with a weight average molecular weight of less than 100,000 containing at least two reactive isocyanate groups. The more preferred isocyanate functional materials typically are polyfunctional molecules such as Desmodur 3390 ® (available from Mobay Corporation), Cythane 3160 ® (available from American Cyanamid Corporation), T1890 ® (available from Huls America Corporation), TDI (toluene diisocyanate) or $\alpha,\omega$-diisocyanates such as 1,6-diisocyanatohexane. Other isocyanate functional compounds that may be used are disclosed in U.S. Pat. No. 4,066,628 which is incorporated herein by reference.

The 1,3-disubstituted imidazole-2-thiones of the present invention have the following structure:

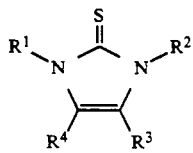

where $R^1$ and $R^2$ are independently hydrocarbyl or substituted hydrocarbyl; and $R^3$ and $R^4$ are independently hydrogen, hydrocarbyl or substituted hydrocarbyl. Any or all of the substituents $R^1$ through $R^4$ may be a polymeric resin so that the catalyst is polymer bound.

The term "substituted hydrocarbyl" is used herein to mean any substituent which does not interfere with the crosslinking reaction. For example, suitable substituents include, but are not limited to, ether, ester, carboxylic acid, halo, amino, hydroxyl, mercapto, vinyl and acetylenic.

Preferred substituents for $R^3$ and $R^4$ are hydrogen. Preferred substituents for $R^1$ and $R^2$ are each independently: $C_1$ to $C_{20}$ straight chain saturated alkyls. Other preferred substituents for $R^1$ and $R^2$ include, but are not limited to, phenyl; (2-cyano)-1-ethyl; (2-methoxy)-1-ethyl; (2-N,N-dimethylamino)-1-ethyl; benzyl; (2-phenyl)-1-ethyl; (2-carboxy)-1-ethyl; (5-carboxy)-1-pentyl; (2-carboethoxy)-1-ethyl; (5-carboethoxy)-1-pentyl; and 4,4,5,5,6,6,7,7,8,8,9,9,10,10,11,11,11-heptadecyl-fluoro-1-undecyl.

More preferred substituents for $R^1$ and $R^2$ are independently chosen from the group methyl, iso-propyl, iso-butyl, and iso-amyl. Most preferrably either $R^1$ or $R^2$ is methyl and the other ($R^2$ or $R^1$) is either n-propyl or n-butyl.

The 1,3-disubstituted imidazole-2-thiones which are used as catalysts for the epoxy/isocyanate crosslinking reaction typically bear simple alkyl or aryl substituents in the 1 and 3 positions ($R^1$ and $R^2$ in the structure above) of the imidazole ring. In some cases it may be desirable to place additional functionality on the substituent groups of the imidazole in order to modify the speed of the cure and physical properties of the cured resin. Such additional functionality may be, but is not limited to, for example, alcohols and carboxylic acids. The most preferred 1,3-disubstituted imidazole-2-thiones are liquids or low melting solids so that there is a high degree of flexibility in formulating the coating. An example of a most preferred 1,3-disubstituted imidazole-2-thione is 1-methyl-3-n-propylimidazole-2-thione. Other preferred imidazole-2-thiones include: 1,3-di-n-propylimidazole-2-thione and 1-methyl-3-n-butylimidazole-2-thione. The 1,3-disubstituted imidazole-2-thiones may be the sole active component of the catalyst package or may be used in conjunction with other catalysts which are included to modify the rate of the crosslinking reaction or the physical properties of the cured coating. Typically, these co-catalysts can be chosen from catalysts which are known in the art to be effective in crosslinking epoxy/isocyanate resins at elevated temperatures. When used in conjunction with 1,3-disubstituted imidazole-2-thiones the co-catalysts become effective (synergistic effects) in the ambient cure systems described in this invention. Examples of such co-catalysts which become active in the ambient cure system are dibutyltin dilaurate (shown to be active at about 160° C. by Parr, W.; Sodin, Clemens; Eur. Pat. Appl. EP 262496 A2 1988) and various zinc and aluminum compounds (shown to be active at about 150° C. by Ashida, K.; Frisch, K. C.; Kordomenos, P.; U.S. Pat. No. 4,066,628 1978).

The 1,3-disubstituted imidazole-2-thiones are available from the procedure taught by Benac, B. L.; Burgess, E. M.; Arduengo, A. J., III (Org. Syn., 1986, 64, 92) or more preferably by the improved procedure described by Arduengo, A. J., III in co-pending, and commonly assigned patent application Ser. No. 07/389,895 which was filed on Aug. 4, 1989. These references are incorporated herein by reference.

None of the components should contain any substituents which would interfere with the curing process.

The reactive functionality is employed typically in a 1:1 equivalent ratio for the epoxy and isocyanate constituents. Reactant ratios from 1.0:0.5 up to 1.0:1.5 can also be advantageously employed to provide excess reactive functionality that can be used to promote adhesion of the coating to both previously and subsequently applied coatings. The 1,3-disubstituted imidazole-2-thione catalyst is present at a level of 1–10% by weight, preferrably about 4–6%, of the total binder.

Generally, the coating composition is applied by conventional techniques such as spraying and electrostatic spraying (although other methods of application obvious to one skilled in the art may also be employed). The resulting coating can be dried and cured at ambient temperatures or it can be baked at elevated temperatures of 60° to 200° C. if desired. The coating may be formulated as an enamel or a lacquer. The coating can be applied in pigmented or non-pigmented (clear) form. The coating can be used in any of a variety of different coating systems such as monocoat, basecoat/clear coat, primer, sealant and so forth.

At ambient temperatures the coating cures to a tack free condition in about 1 to 3 hours and within about 24 hours the coating is substantially cured. In about 5–7 days, the coating is completely cured. Coatings are applied to form a finish about 0.5–5.0 mils thick, and preferably 1–2 mils thick. The activated coating has excellent clarity and very little color (if non-pigmented) and has excellent pot-life. The finish has excellent gloss, retention of the "wet-look" even weeks after application, excellent resistance to acids and bases, good hardness and fast cure times, and good adhesion to the substrate. Many of the attributes of this coating make it particularly useful as an automotive finish.

Improved weatherability of the clear finish can be obtained by the addition of about 0.1–5.0%, by weight, based on the weight of the binder of an ultraviolet light stabilizer or a combination of ultraviolet light stabilizers. These light stabilizers include ultraviolet light absorbers, screeners, quenchers and specific hindered amine light stabilizers. Additionally, about 0.1–5.0% by weight, based on the weight of the binder, of an antioxidant can be added to the uncured clear coat.

Typically, ultraviolet light stabilizers that are useful are disclosed in U.S. Pat. No. 4,816,500.

Generally, when the coating composition of this invention is used as a clear coating, it is applied by convential spraying techniques over a color or basecoat of an automobile or truck. The coatings can be allowed to cure at ambient temperatures or baked at about 60° to 200° C. for about 10 to 40 minutes to accelerate the cure rate and aid in residual solvent evaporation. In refinishing automobiles and trucks, the clear coating is applied to a color coat and is then allowed to cure at ambient temperatures or baked to form the clear coat finish. The resulting clear coat finishes are about 1–5 mils thick, preferably about 1–2 mils thick, and have excellent gloss, retention of the "wet-look" even weeks after application, excellent resistance to acids and bases, good hardness and fast cure times, and good adhesion to the base or color coat.

The composition can be pigmented to form a colored finish or primer. About 0.1–200.0% by weight, based on the weight of the binder, of conventional pigments can be added using conventional techniques in which a mill base containing pigment, dispersant and solvent is first formed. The mill base is then mixed with the composition to form a colored composition. This composition can be applied and cured as described above.

The long pot-life of the coating formulations described in this invention is one of their most valuable features. In some cases, the activated coating composition may be kept for several hours to days without excessive increase in viscosity. Coating compositions kept for these longer time periods may show a retarded cure rate when the coating is finally applied. However, the use of the 1,3-disubstituted imidazole-2-thiones as catalysts allows the coating composition to be reactivated by the addition of incremental 1,3-disubstituted imidazole-2-thione catalyst.

The following examples illustrate the invention and its advantage over convential coatings. All parts and percentages are on a weight basis, unless otherwise stated. The examples are merely illustrative and should not be read in any way to limit the scope of this invention.

EXAMPLE 1

Preparation of an Epoxy Functionalized Polymer

Trimethyl Silane Protected Hydroxy Ethyl

Methacrylate/Glycidal Methacrylate/Isobutyl

Methacrylate 1/5/5 (Skewed Block Polymer)

| Step | Ingredient | Parts by Weight |
| --- | --- | --- |
| I. | Tetrahydrofuran (anhydrous) | 714.428 |
| | 1-(2-Trimethylsiloxy)ethoxy-1- Trimethylsiloxy-2-Methyl Propene | 80.143 |
| | Glycidyl Methacrylate Monomer | 154.143 |
| | Isobutyl Methacrylate Monomer | 51.285 |

The ingredients of Step I were dried over molecular sieves. The ingredients were charged into a clean, dry reactor and the resulting solution was cooled to −5° C.

| Step | Ingredient | Parts by Weight |
| --- | --- | --- |
| II. | Tetrabutyl ammonium chlorobenzoate | 0.286 |
| | Tetrahydrofuran | 0.571 |

The dry ingredients of Step II were combined to form a solution. The cooling of Step I components was temporarily discontinued for the start of an exothermic reaction. The Step II solution was added to the reaction vessel containing the Step I materials over a 30 minute period. The addition was stopped when reaction began to produce an exotherm. When the exotherm raised the temperature to 10°–15° C. the cooling was resumed. When the charged monomer was 75% converted, Step III was began.

| Step | Ingredient | Parts by Weight |
| --- | --- | --- |
| IIIa | Tetrahydrofuran | 2.143 |
| | Tetrabutyl ammonium chlorobenzoate | 0.286 |
| IIIb | Glycidyl methacrylate | 51.286 |
| | Isobutyl methacrylate | 154.143 |

Two solutions were prepared from the dry ingredients of Steps IIIa and IIIb. The addition of both solutions IIIa and IIIb (to the reaction vessel of Steps I and II) began simultaneously. The addition of the Step IIIa solution required 40 minutes. The addition of the Step IIIb solution required 30 minutes.

| Step | Ingredient | Parts by Weight |
|---|---|---|
| IV | Methanol | 13.714 |
|  | Glacial Acetic Acid | 6.143 |

Once complete conversion of the monomers occurred, all the above Step IV ingredients were added to the reaction vessel in the order listed. The excess solvent (428.571 parts) was distilled off to yield 800 parts of a polymer solution intermediate at 61% solids.

| Step | Ingredient | Parts by Weight |
|---|---|---|
| V | Above Polymer Solution Intermediate | 800.000 |
|  | Butyl Acetate | 189.800 |
|  | Glacial Acetic Acid | 4.25 |

The Step V concentration of the polymer solution intermediate was accomplished by the addition of the Step V components followed by the removal by distillation of 313.2 parts of volatiles for a resulting solution at 65% solids.

This epoxy functionalized polymer at 65% solids is henceforth referred to as Ep 2.

EXAMPLE 2

Effect of 1,3-disubstituted imidazole-2-thiones as Curing Agents in Various Epoxy/Isocyanate Clear Coatings Explanation of abbreviations used in Example 2:
Iso 1: Desmodur 3390 ® Isocyanate Crosslinker from Mobay
Iso 2: Cythane 3160 ® Isocyanate Crosslinker from American Cyanamid
Iso 3: IPDI-T 1890L ® Isocyanate Crosslinker from Huls America
Ep 1: Araldite CY184 ® Epoxy Crosslinker from Ciba-Geigy
Ep 2: Epoxy Functionalized Polymer at 65% solids described in Example 1.
Cat. 1: 30% Solution of 1-Methyl-3-propylimidazole-2-thione in Xylene
Sol.: The solvent has the following composition:
 Toluene: 50 parts
 Xylene: 20 parts
 Ethylacetate: 10 parts
 Methylisobutylketone: 10 parts
 Propyleneglycolmonomethyletheracetate: 10 parts The following clears were prepared by mixing the components as listed in Table 1 below.

TABLE 1
Compositions of Various Test Clear Coats

| Clear Coat Code | Iso 1 | Iso 2 | Iso 3 | Ep 1 | Ep 2 | Cat.1 | Sol. |
|---|---|---|---|---|---|---|---|
| A | 23.117 | 0 | 0 | 0 | 44.913 | 0 | 26.968 |
| A+ | 22.017 | 0 | 0 | 0 | 42.774 | 7.936 | 22.271 |
| B | 0 | 39.748 | 0 | 18.2 | 0 | 0 | 37.05 |
| B+ | 0 | 37.856 | 0 | 17.334 | 0 | 7.936 | 31.873 |
| C | 0 | 33.216 | 0 | 0 | 36.04 | 0 | 25.742 |
| C+ | 0 | 31.635 | 0 | 0 | 34.324 | 7.936 | 21.103 |
| D | 0 | 0 | 41.766 | 20.763 | 0 | 0 | 32.47 |
| D+ | 0 | 0 | 39.777 | 19.774 | 0 | 7.936 | 27.511 |
| E | 0 | 0 | 34.113 | 0 | 40.185 | 0 | 20.701 |
| E+ | 0 | 0 | 32.488 | 0 | 38.272 | 7.936 | 16.302 |

Each clear was applied by 0.010 inch blade to various substrates for testing. For swelling ratio tests the clear was applied to panels of thermoplastic polyolefin. For color testing the clear was applied to panels of white pigmented glass. For hardness and chemical spot testing the clears were applied to glass panels.

TABLE 2
Summary of The Performance of Various Clear Coats

| Property | A | A+ | B | B+ | C | C+ | D | D+ | E | E+ |
|---|---|---|---|---|---|---|---|---|---|---|
| Visc. 5d | 1.1 | 1.2 | 1 | 1 | 1.1 | 1.1 | 0.9 | 0.9 | 1.2 | 1.2 |
| Per. Hard. 1d | 0 | 159 | 0 | 0 | 32 | 207 | 0 | 0 | 36 | 130 |
| Swell. Ratio 1d | ∞ | 1.67 | ∞ | ∞ | ∞ | 1.68 | ∞ | ∞ | ∞ | ∞ |
| Per. Hard. 7d | 18 | 145 | 0 | 228 | 65 | 199 | 0 | 216 | 96 | 194 |
| Swell. Ratio 7d | ∞ | 1.58 | ∞ | 1.76 | ∞ | 1.67 | ∞ | 1.32 | ∞ | 1.79 |
| 10% $H_2SO_4$ 7d | — | 8 | — | 5 | 4 | 8 | — | 5 | 5 | 10 |
| 5% NaOH 7d | — | 9 | — | 5 | 5 | 10 | — | 5 | 5 | 7 |
| Film thick. μ | — | 50 | — | 69 | 757 | 74 | — | 76 | 88 | 82 |
| Film Color 7d | — | .44 | — | .60 | .35 | .79 | — | .41 | .34 | .49 |

An entry of "∞" for swell ratio indicates that the film was not cured at all. An entry of a dash "—" indicates that the property could not be determined because the film had not cured sufficiently.

DESCRIPTION OF VARIOUS PROPERTY VALUES AND METHODS OF DETERMINATION

Visc. 5d

Viscosity of clear coat formulation 5 days after mixing. The value reported was the time (in seconds) required for a gas bubble to traverse from the bottom to the top of an inverted Gardner-Holt tube.

Per. Hard. 1d and 7d

Persoz hardness after 1 day from initial draw down. The solutions of mixed ingredients were drawn down on a 4 inch by 12 inch glass panel. The solids were normally 45% or 50% in our experiments. We used a 0.01 inch Doctor blade. Film thicknesses were in the range of 50 to 90 microns. After 1 day and 7 days (plus or minus 2 hours) the hardness of the film was measured by a Persoz pendulum.

Swell. Ratio 1d and 7d

Swelling ratio of the film was determined after 1 and 7 days from the initial draw down of the mixed coating on a panel of thermoplastic polyolefin (TPO).

On the test day a free film was lifted off the TPO with a single edged razor. A circular specimen was punched from the film with a 3.1 mm grid punch. We usually sandwiched the film in between aluminum foil for punching so that the specimen had enough mass to fall down the barrel of the punch into a catch pan. The 3.1 mm specimen was separated from the aluminum layers and then mounted on a slide. The diameter of the specimen was measured in filar units using a microscope equipped with a filar micrometer. This diameter was $D_O$. Methylene chloride was dropped onto the specimen; swelling starts; a cover glass was placed over the swelling specimen; swelling reached its equilibrium value and the swollen diameter, $D_s$ was measured. The swelling ratio was then determined as: Swell. Ratio $=(D_s/2)^2/(D_O/2)^2$. This was the ratio of the swollen to unswollen areas. We have used swelling ratio as a measure of degree of cure in hundreds of screening tests and have adopted the following guidelines for describing cure:

| Cure | CH$_2$Cl$_2$ Swelling Ratio (7 day) |
|---|---|
| Excellent | less than 1.55 |
| Very Good | 1.55–1.65 |
| Good | 1.66–1.75 |
| Fair | 1.76–1.85 |
| Poor | 1.86–2.00 |
| Very Poor | greater than 2.00 |

10% H$_2$SO$_4$ 7d and 5% NaOH 7d

The chemical resistance was checked with 10% aqueous sulfuric acid and 5% aqueous sodium hydroxide after 7 days from the initial draw down. The film drawn down on the glass for the Persoz hardness was spotted with the chemical for a sixteen hour period. The chemical was then wiped away. After 30 minutes the film was tested for swelling, softening, wrinkling or discoloration. A perfect rating of 10 indicates that there is no effect of the chemical on the film. Ratings of 8 or higher indicate commercially acceptable values.

Film Color 7d

The solution of mixed ingredients was drawn down over the bottom half of a white substrate. In seven days the color of the uncoated white substrate ($B_0$) was read using a MAC colorimeter. The color of the coated panel ($B_1$) was measured. The two measurements were made at a flat angle. The reported B value is $B_1-B_0$. The B value is a measure of the yellowness of the film. A B value of 0 means the film is colorless. The B values shown for the cured films in Table 2 are considered to be very good (i.e. a substantially colorless film).

EXAMPLE 3

Comparison of a Tertiary Amine Curing Agent with 1-Methyl-3-propylimidazole-2-thione A modification of the "A+" coating used in Example 2 was compared with an identical coating in which the 1-methyl-3-propylimidazole-2-thione catalyst was replaced with a molar equivalent amount of a tertiary amine catalyst, 1,4-diazabicyclo[2.2.2]octane (DABCO). These modifications were formulated at 52% solids from the same components listed in Example 2. These two formulations where then applied by spraying to metal substrates immediately after mixing, two hours after mixing and four hours after mixing.

The 1-methyl-3-propylimidazole-2-thione catalyst based coating of this example is henceforth refered to as "$F_{(thione)}$". The amine based coating of this example is henceforth referred to as "$F_{(DABCO)}$". Table 3 gives the compositions of the coatings used in this example. Unless otherwise indicated, the abbreviations are those used in Example 2. Weights are given in grams.

TABLE 3

Composition of Comparative Amine and Thione Based Coatings.

| Coating Code | Composition (grams) | | | | |
|---|---|---|---|---|---|
| | Iso 1 | Ep 2 | Cat. 1 | Cat. 2* | Sol. |
| $F_{(thione)}$ | 91.32 | 178.35 | 32.97 | 0 | 97.37 |
| $F_{(DABCO)}$ | 94.18 | 183.95 | 0 | 36.62 | 85.24 |

*Cat 2. was a 10% solution of DABCO in xylene.

$F_{(thione)}$ and $F_{(DABCO)}$ were applied by spraying immediately after mixing, $F_{("cat")}$-0 Hr; two hours after mixing, $F_{("cat")}$-2 Hr; and four hours after mixing $F_{("cat")}$-4 Hr. The viscosity before spraying was also measured at the aforementioned intervals by means of a Zahn #2 tube. The results of this example are presented in Table 4.

TABLE 4

Results of Imidazolethione vs. Amine Comparison Study.

| | Coating Code | | | | | |
|---|---|---|---|---|---|---|
| | $F_{(thione)}$ | | | $F_{(DABCO)}$ | | |
| Property | 0 Hr | 2 Hr | 4 Hr | 0 Hr | 2 Hr | 4 Hr |
| Visc.$^a$ | 20.1 | 20.2 | 21.1 | 20.6 | ∞ | ∞ |
| Film thick. μ | 65 | 65 | 65 | 65 | 65 | 65 |
| Per. Hard 1d | 130 | — | — | X | X | X |
| Swell. Ratio 1d | 1.66 | — | — | X | X | X |
| DOI$_b$ | 89 | 87 | 95 | X | X | X |

$^a$Viscosity was measured with a #2 Zahn tube.
$^b$DOI is the Definition of Reflected Images (0–100: 0—poorest, 100—excellent).
An entry of "∞" indicates the coating had gelled.
An entry of "X" indicates the film quality was so poor that the property could not be determined.
An entry of "—" indicates the measurement was not made.

EXAMPLE 4

Comparison of a Tin Curing Agent with 1-Methyl-3-propylimidazole-2-thione

A modification of the "A+" coating used in Example 2 was compared with an identical coating in which the 1-methyl-3-propylimidazole-2-thione catalyst was replaced with a molar equivalent amount of an electrophilic tin catalyst, dibutyltin diacetate (DBTA). These modifications were formulated at 52% solids from the same components listed in Example 2. These two formulations were then applied by spraying two metal substrates immediately after mixing, two hours after mixing and four hours after mixing.

The 1-methyl-3-propylimidazole-2-thione based coating of this example is henceforth referred to as "$G_{(thione)}$". The tin based coating of this example is henceforth referred to as "$G_{(DBTA)}$". Table 5 gives the compositions of the coatings used in this example. Unless otherwise indicated, the abbreviations are those used in Example 2. Weights are given in grams.

TABLE 5

| Coating | Composition of Comparative Tin and Thione Based Coatings. | | | | |
|---|---|---|---|---|---|
| Code | Composition (grams) | | | | |
| | Iso 1 | Ep 2 | Cat. 1 | Cat. 3* | Sol. |
| $G_{(thione)}$ | 91.32 | 178.35 | 32.97 | 0 | 97.37 |
| $G_{(DABCO)}$ | 86.19 | 168.34 | 0 | 42.01 | 103.46 |

*Cat 3 was a 50% solution of dibutyltin diacetate in xylene.

$G_{(thione)}$ and $G_{(DBTA)}$ were applied by spraying immediately after mixing, $G_{("cat")}$-0 Hr; two hours after mixing, $G_{("cat")}$-2 Hr; and four hours after mixing $G_{("cat")}$-4 Hr. The viscosity before spraying was also measured at the aforementioned intervals by means of a Zahn #2 tube. The results of this example are presented in Table 6.

TABLE 6

Results of Imidazolethione vs. Tin Comparison Study.

| Property | Coating Code | | | | | |
|---|---|---|---|---|---|---|
| | $G_{(thione)}$ | | | $G_{(DBTA)}$ | | |
| | 0 Hr | 2 Hr | 4 Hr | 0 Hr | 2 Hr | 4 Hr |
| Visc.$^a$ | 20.1 | 20.2 | 21.1 | 21.1 | 29.6 | 34.4 |
| Film thick. | 65 | 65 | 65 | 65 | 65 | 65 |
| Per. Hard 1d | 130 | — | — | 82 | — | — |
| Swell. Ratio 1d | 1.66 | — | — | 1.79 | — | — |
| DOI$^b$ | 89 | 87 | 95 | 83 | 72 | 22 |

$^a$Viscosity is measured with a #2 Zahn tube.
$^b$DOI is the Definition of Reflected Images (0–100: 0—poorest, 100—excellent).
An entry of "—" indicates the measurement was not made.

SUMMARY OF RESULTS

As can be seen from the above examples, epoxy/isocyanate coatings which employ the 1,3-disubstituted imidazole-2-thione catalyst show good ambient temperature cure and produce a cured finish that has good to excellent performance characteristics.

The coatings of Example 2 showed a good seven day ambient temperature cure, as indicated by Persoz hardness, only when 1-methyl-3-propylimidazole-2-thione was present as a curing agent (note: the coating compositions identified by "+" contained the 1-methyl-3-propylimidazole-2-thione). Coating compositions A+, C+ and E+, which utilized the epoxy copolymer Ep 2 (prepared in Example 1), all showed substantial ambient temperature cure after only 1 day as indicated by both the Persoz hardness and swelling ratio. Coating using Ep 2 (the epoxide formulated with an acetic acid workup) have a better balance of properties than the coatings containing other epoxy resins. Coatings B+ and E+ showed a fair ambient temperature 7 day cure, while A+, C+ and D+ all showed good to excellent ambient temperature cures after 7 days as indicated by the swelling ratios. Coatings A+, B+, C+ and E+ all showed good to excellent chemical resistance as indicated by the acid and base spot tests. The film colors of the cured compositions were all in a commerically useful range. Particularly striking from the results in Table 2 is the low viscosity of the activated coating composition after 5 days. In most cases, the viscosity shows no difference from that of the non-activated composition. This indicates an extremely long pot-life for the activated coating compositions.

Example 3 is a comparative example that demonstrates that a nucleophilic tertiary amine curing agent such as 1,4-diazabicyclo[2.2.2]octane (DABCO) will cure the epoxy/isocyanate coatings but produces an inferior coating that suffers from a rapid gelation of the coating composition that makes application of the coating very difficult. The lifetime of the coating $F_{(DABCO)}$ before gelation occurs is too short for most commerical applications. Additionally, the spray applications produced finishes which had a spattered and non-uniform appearance. These problems were not encountered using the thione catalyst.

Example 4 is another comparative example that indicates that the conventional electrophilic curing agents (represented here by dibutyltin diacetate) which previously have been used in epoxy/isocyanate crosslinking chemistry (see Prior Art section above) are not effective in the ambient cure chemistry described in this invention. The rapid gelation of the coating $G_{(DBTA)}$ is readily apparent from the poor (low) DOI of finishes sprayed out 2 and 4 hours after mixing the formulation. However, we have found that these electrophilic catalysts do become effective in the ambient cure system when used as co-catalysts in conjunction with the 1,3-disubstituted imidazole-2-thiones of this invention.

We claim:

1. A curable composition comprising:
   a) a compound having epoxy functionality,
   b) a compound having isocyanate functionality,
   c) a catalyst which catalyzes a crosslinking reaction between compound a) and compound b); the catalyst having the structure:

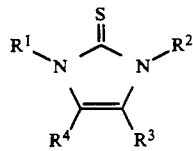

where $R^1$ and $R^2$ are each independently hydrocarbyl or substituted hydrocarbyl; and $R^3$ and $R^4$ are independently hydrogen, hydrocarbyl or substituted hydrocarbyl.

2. The curable composition of claim 1, wherein $R^3$ and $R^4$ are hydrogen; and $R^1$ and $R^2$ are independently $C_1$ to $C_{20}$ straight chain saturated alkyls.

3. The curable composition of claim 1 wherein $R^3$ and $R^4$ are hydrogen; and $R^1$ and $R^2$ are each independently methyl; phenyl; ethyl; (2-cyano)-1-ethyl; (2-methoxy)-1-ethyl; (2-N,N-dimethylamino)-1-ethyl; benzyl; (2-phenyl)-1-ethyl; (2-carboxy)-1-ethyl; (5-carboxy)-1-pentyl; (2-carboethoxy)-1-ethyl; (5-carboethoxy)-1-pentyl; 4,4,5,5,6,6,7,7,8,8,9,9,10,10,11,11,11-heptadecyl-fluoro-1-undecyl.

4. The curable composition of claim 1, wherein $R^3$ and $R^4$ are hydrogen; and $R^1$ and $R^2$ are each independently either methyl, iso-propyl, iso-butyl, or iso-amyl.

5. The curable composition of claim 1, wherein $R^3$ and $R^4$ are hydrogen; and $R^1$ is methyl and $R^2$ is either n-propyl or n-butyl.

6. The curable composition of claim 1, wherein compound a) is any polymer or co-polymer with a weight average molecular weight of less than 100,000 containing at least two reactive epoxy groups.

7. The curable composition of claim 1, wherein compound b) is any polymer or co-polymer with a weight average molecular weight of less than 100,000 containing at least two reactive isocyanate groups.

8. A substrate coated with the curable composition of claim 1.

9. A process of catalyzing the reaction between a compound having isocyanate functionality and epoxy functionality comprising contacting the isocyanate compound and epoxy compound in the presence of a catalyst where the catalyst has the following formula:

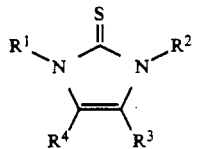

where $R^1$ and $R^2$ are each independently hydrocarbyl or substituted hydrocarbyl; and $R^3$ and $R^4$ are independently hydrogen, hydrocarbyl or substituted hydrocarbyl.

10. The process of claim 9, wherein $R^3$ and $R^4$ are hydrogen; and $R^1$ and $R^2$ are independently chosen $C_1$ to $C_{20}$ straight chain saturated alkyls.

11. The process of claim 9 wherein $R^3$ and $R^4$ are hydrogen; and $R^1$ and $R^2$ are each independently methyl; phenyl; ethyl; (2-cyano)-1-ethyl; (2-methoxy)-1-ethyl; (2-N,N-dimethylamino)-1-ethyl; benzyl; (2-phenyl)-1-ethyl; (2-carboxy)-1-ethyl; (5-carboxy)-1-pentyl; (2-carboethoxy)-1-ethyl; (5-carboethoxy)-1-pentyl; 4,4,5,5,6,6,7,7,8,8,9,9,10,10,11,11,11-heptadecyl-fluoro-1-undecyl.

12. The process of claim 9, wherein $R^3$ and $R^4$ are hydrogen; and $R^1$ and $R^2$ are each independently either methyl, iso-propyl, iso-butyl, or iso-amyl.

13. The process of claim 9, wherein $R^3$ and $R^4$ are hydrogen; and $R^1$ is methyl and $R^2$ is either n-propyl or n-butyl.

14. The process of claim 9, wherein the epoxy compound is any polymer or co-polymer with a weight average molecular weight of less than 100,000 containing at least two reactive epoxy groups.

15. The process of claim 9, wherein the isocyanate compound is any polymer or co-polymer with a weight average molecular weight of less than 100,000 containing at least two reactive isocyanate groups.

* * * * *